US012676352B2

(12) United States Patent
Lee

(10) Patent No.: US 12,676,352 B2
(45) Date of Patent: Jul. 7, 2026

(54) BATTERY MODULE HAVING PAD COMPOSITE HAVING SWELLING ABSORPTION AND HEAT SHIELDING FUNCTION, BATTERY PACK COMPRISING SAME AND VEHICLE

(71) Applicant: LG CHEM, LTD., Seoul (KR)

(72) Inventor: Jin-Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 721 days.

(21) Appl. No.: 17/279,903

(22) PCT Filed: Mar. 4, 2020

(86) PCT No.: PCT/KR2020/003082
§ 371 (c)(1),
(2) Date: Mar. 25, 2021

(87) PCT Pub. No.: WO2020/180114
PCT Pub. Date: Sep. 10, 2020

(65) Prior Publication Data
US 2022/0037714 A1 Feb. 3, 2022

(30) Foreign Application Priority Data
Mar. 4, 2019 (KR) ........................ 10-2019-0024840

(51) Int. Cl.
*H01M 10/613* (2014.01)
*H01M 10/625* (2014.01)
(Continued)

(52) U.S. Cl.
CPC ....... *H01M 10/613* (2015.04); *H01M 10/625* (2015.04); *H01M 10/647* (2015.04);
(Continued)

(58) Field of Classification Search
CPC ............. H01M 10/613; H01M 10/625; H01M 10/647; H01M 10/658; H01M 50/211;
(Continued)

(56) References Cited

U.S. PATENT DOCUMENTS 3,770,565 A 11/1973 Schcolar et al.
2006/0243315 A1 11/2006 Chrysler et al.
(Continued)

FOREIGN PATENT DOCUMENTS

CN 206163663 U 5/2017
CN 107437631 A 12/2017
(Continued)

OTHER PUBLICATIONS

Machine translation of KR 20170135476 A (Year: 2017).*
(Continued)

*Primary Examiner* — Dah-Wei D. Yuan
(74) *Attorney, Agent, or Firm* — Birch, Stewart, Kolasch & Birch, LLP

(57) ABSTRACT

A battery module includes a cell stack including a plurality of battery cells and at least one pad composite interposed between neighboring battery cells; and a module case configured to accommodate the cell stack, wherein the pad composite includes a pair of swelling absorption pads compressed according to a volume expansion of the battery cell caused by swelling; and a heat shielding pad interposed between the pair of swelling absorption pads to block heat transfer between the neighboring battery cells and configured to expand at a preset reference temperature or above.

5 Claims, 5 Drawing Sheets

(51) Int. Cl.

| | | |
|---|---|---|
| *H01M 10/647* | (2014.01) | |
| *H01M 10/658* | (2014.01) | |
| *H01M 50/211* | (2021.01) | |
| *H01M 50/242* | (2021.01) | |
| *H01M 50/293* | (2021.01) | |

(52) U.S. Cl.
CPC ....... *H01M 10/658* (2015.04); *H01M 50/211* (2021.01); *H01M 50/242* (2021.01); *H01M 50/293* (2021.01); *H01M 2220/20* (2013.01)

(58) Field of Classification Search
CPC ............. H01M 50/242; H01M 50/293; H01M 2220/20
USPC .......................................................... 429/99
See application file for complete search history.

(56) References Cited

U.S. PATENT DOCUMENTS

| | | | |
|---|---|---|---|
| 2008/0292950 | A1 | 11/2008 | Maeda et al. |
| 2009/0275678 | A1 | 11/2009 | Kumazawa et al. |
| 2012/0028107 | A1 | 2/2012 | Sugita et al. |
| 2015/0037626 | A1 | 2/2015 | Malcolm et al. |
| 2016/0164061 | A1 | 6/2016 | Han et al. |
| 2016/0336627 | A1 | 11/2016 | Syed et al. |
| 2017/0068291 | A1* | 3/2017 | Cheng ................... H10N 10/17 |
| 2018/0108881 | A1 | 4/2018 | Jin et al. |
| 2018/0248160 | A1 | 8/2018 | Lee |
| 2018/0254535 | A1 | 9/2018 | Kim et al. |
| 2019/0020079 | A1 | 1/2019 | Lee et al. |

FOREIGN PATENT DOCUMENTS

| | | |
|---|---|---|
| CN | 108028334 A | 5/2018 |
| DE | 10 2015 007 408 A1 | 12/2016 |
| JP | 2009-4362 A | 1/2009 |
| JP | 2014-183013 A | 9/2014 |
| JP | 2018-116805 A | 7/2018 |
| JP | 2018-206605 A | 12/2018 |
| JP | 2018-536967 A | 12/2018 |
| KR | 10-2010-0081942 A | 7/2010 |
| KR | 10-2014-0084594 A | 7/2014 |
| KR | 10-1441207 B1 | 9/2014 |
| KR | 10-2016-0069807 A | 6/2016 |
| KR | 10-2016-0128019 A | 11/2016 |
| KR | 10-2017-0029283 A | 3/2017 |
| KR | 10-2017-0103701 A | 9/2017 |
| KR | 10-2017-0135476 A | 12/2017 |
| KR | 10-2018-0095982 A | 8/2018 |
| KR | 10-2018-0138416 A | 12/2018 |
| WO | WO 2008/001790 A1 | 1/2008 |
| WO | WO-2013121981 A1 * | 8/2013 ......... G03G 9/08755 |
| WO | WO 2018/082172 A1 | 4/2018 |

OTHER PUBLICATIONS

Machine translation of JP 2018206605 A (Year: 2018).*
International Search Report issued in PCT/KR2020/003082 (PCT/ISA/210), dated Jun. 17, 2020.
Extended European Search Report for European Application No. 20767165.2, dated Jan. 18, 2022.
Ai Long, "Application Manual for Environmental-Friendly Building and Decoration Engineering plan-design-construction," China Workers Publishing House, May 2001, 9 pages total.
"Epplix Expanded Polypropylene," Epplix, Jan. 23, 2019, pp. 1-6.
"Expandable Flake Graphite," Asbury Carbons, May 11, 2025, 11 pages total.
"Safety Data Sheet (SDS), ARPRO Expanded Polypropylene (EPP) Black and White," JSP, Jan. 5, 2018, pp. 1-4.
"Shrink Considerations," Bamberger Polymers Tech Tips, Nov. 2021, 1 page total.
U.S. Office Action for U.S. Appl. No. 18/486,673, dated Aug. 13, 2025.
"List of Thermal Expansion Coefficients (CTE) for Natural and Engineered Materials," https://www.msesupplies.com/pages/list-of-thermal-expansion-coefficients-cte-for-natural-and-engineeredBYDxO_4nafuztzriE95mQ6ITC, 2025, 27 pages total.
U.S. Office Action for U.S. Appl. No. 18/437,848, dated Jun. 30, 2025.
U.S. Office Action for U.S. Appl. No. 18/437,778, dated Jun. 30, 2025.
U.S. Office Action for U.S. Appl. No. 18/486,673, dated Feb. 24, 2026.

\* cited by examiner

BATTERY MODULE HAVING PAD COMPOSITE HAVING SWELLING ABSORPTION AND HEAT SHIELDING FUNCTION, BATTERY PACK COMPRISING SAME AND VEHICLE

TECHNICAL FIELD

The present disclosure relates to a battery module including a pad composite having swelling absorption and heat shielding functions, a battery pack and a vehicle including the battery module, and more specifically, to a battery module including a pad composite having a swelling absorption pad compressed according to expansion of a battery cell by swelling and a heat shielding pad expanded when the swelling absorption pad is damaged due to a rise in an internal temperature of the battery module to fill the space occupied by the swelling absorption pad, and a battery pack and a vehicle including the battery module.

The present application claims priority to Korean Patent Application No. 10-2019-0024840 filed on Mar. 4, 2019 in the Republic of Korea, the disclosures of which are incorporated herein by reference.

BACKGROUND ART

In general, a battery module includes a cooling system to prevent the life span of the battery module from being shortened rapidly due to temperature when used for a long time. The cooling system is designed in consideration of a heat generation amount and the like according to the environment in which the battery module is used.

However, if some battery cells show abnormal heating due to failure while the battery module is being used, the temperature may continuously rise. In this case, if the temperature exceeds a critical temperature, thermal runaway may occur to cause a safety issue.

That is, if the thermal runaway generated in some battery cells propagates to neighboring battery cells within a short time, the temperature of the battery module rises rapidly as a whole, which may lead to a rise in temperature of the entire battery pack including a plurality of battery modules and thus seriously damage property and human life. Therefore, in order to prevent rapid propagation of the thermal runaway phenomenon, it is necessary to apply a member for heat shielding between adjacent battery cells.

In addition, a buffer member compressed according to expansion of the battery cell due to swelling to absorb the swelling is applied between adjacent battery cells. The buffer member may employ an EPP pad (an expanded polypropylene pad) or a urethane pad.

The buffer pad made of this material has a certain level of elasticity in a normal use of the battery module to have a function of absorbing swelling by being compressed when the battery cell expands due to swelling. Also, the buffer pad may have a function of maintaining a gap between adjacent battery cells and delaying heat transfer between adjacent battery cells at abnormal heating.

However, the buffer pad of this material may be easily damaged and contracted if a thermal runaway phenomenon occurs in some battery cells so that the temperature in the battery module exceeds a threshold value.

If the buffer pad is damaged by heat and contracted as described above, the gap between adjacent battery cells is reduced with the buffer pad being interposed therebetween, and thus the thermal runaway phenomenon may be propagated faster between the adjacent battery cells.

Therefore, there is also a need to develop a battery module having a structure capable of absorbing a volume expansion caused by swelling of the battery cell, maintaining the gap between adjacent battery cells constantly even if the temperature in the battery module rises above a threshold value due to abnormal heating generated in some battery cells, and delaying propagation of thermal runaway between adjacent battery cells.

DISCLOSURE

Technical Problem

The present disclosure is designed to solve the problems of the related art, and therefore the present disclosure is directed to providing a battery module having a structure that may absorb a volume expansion caused by swelling of the battery cell, maintain the gap between adjacent battery cells constantly even if the temperature in the battery module rises above a threshold value due to abnormal heating generated in some battery cells, and delay propagation of thermal runaway between adjacent battery cells.

However, the technical problem to be solved by the present disclosure is not limited to the above, and other objects not mentioned herein will be understood from the following description by those skilled in the art.

Technical Solution

In one aspect of the present disclosure, there is provided a battery module, comprising: a cell stack including a plurality of battery cells and at least one pad composite interposed between neighboring battery cells of the plurality of battery cells; and a module case configured to accommodate the cell stack, wherein the pad composite includes: a pair of swelling absorption pads compressed by a volume expansion of the plurality of battery cell caused by swelling; and a heat shielding pad interposed between the pair of swelling absorption pads to block heat transfer between the neighboring battery cells and configured to expand at a reference temperature or above.

The pair of swelling absorption pads may be shrunken at the reference temperature or above to a reduced thickness.

The heat shielding pad may be expanded at the reference temperature or above to fill a space created by shrinkage of the pair of swelling absorption pads.

The heat shielding pad may have an expansion rate of 5 to 40 times in a thickness direction at the reference temperature or above.

Each of the plurality of battery cells may be a pouch-type battery cell.

The pad composite may be provided in single, and the single pad composite may be disposed at a center of the cell stack in a stacking direction.

The battery module may further comprise a plurality of swelling absorption pads respectively disposed between cell groups, each cell group including a plurality of battery cells.

The pad composite may be provided in plural, and the plurality of pad composites may be respectively disposed between cell groups, each cell group including a plurality of battery cells.

The pair of swelling absorption pads may include at least one of expanded polypropylene (EPP) and urethane.

The heat shielding pad may include at least one of epoxy-based resin, butyl-based resin, and vinyl chloride-based resin.

In another aspect of the present disclosure, there are also provided a battery pack and a vehicle, which comprises the battery module according to the present disclosure.

Advantageous Effects

According to an embodiment of the present disclosure, it is possible to provide a battery module having a structure capable of absorbing a volume expansion caused by swelling of the battery cell, maintaining the gap between adjacent battery cells constantly even if the temperature in the battery module rises above a threshold value due to abnormal heating generated in some battery cells, and delaying propagation of thermal runaway between adjacent battery cells.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 3 is a diagram showing a cell stack applied to the battery module according to an embodiment of the present disclosure, in which the temperature in the battery module is lower than a reference temperature.

FIG. 4 is a diagram showing the cell stack applied to the battery module according to an embodiment of the present disclosure, in which the temperature in the battery module is equal to or higher than the reference temperature.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, a battery module according to an embodiment of the present disclosure will be described with reference to FIGS. 1 to 4.

Figure 1:
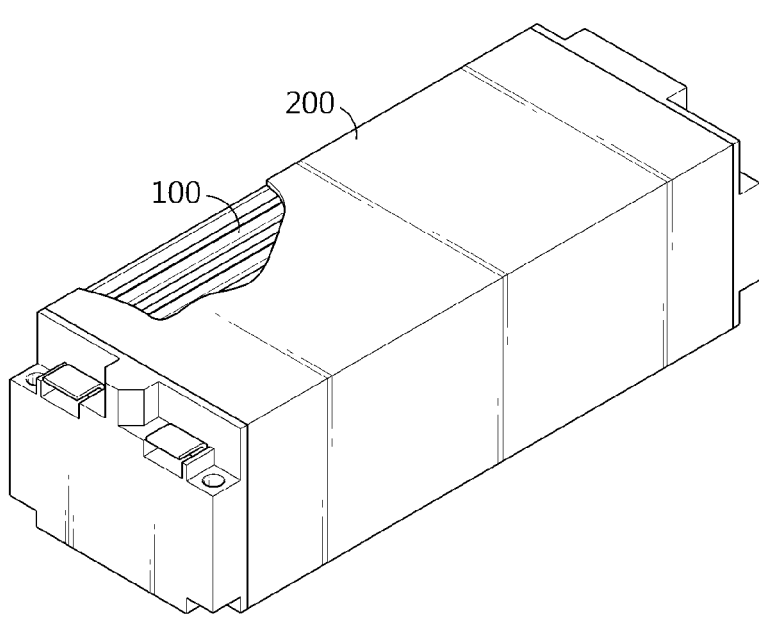
FIG. 1 is a perspective view showing a battery module according to an embodiment of the present disclosure.
Figure 2:
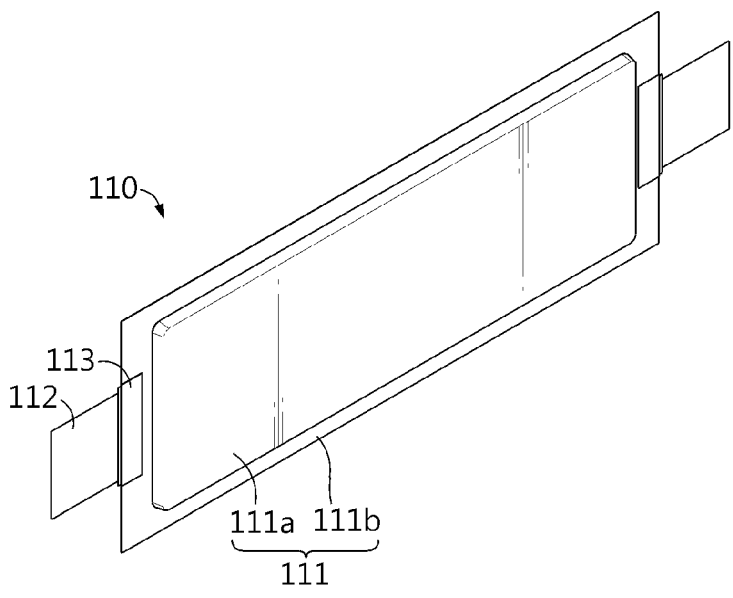
FIG. 2 is a diagram showing a battery cell applied to the battery module according to an embodiment of the present disclosure.
Figure 3:
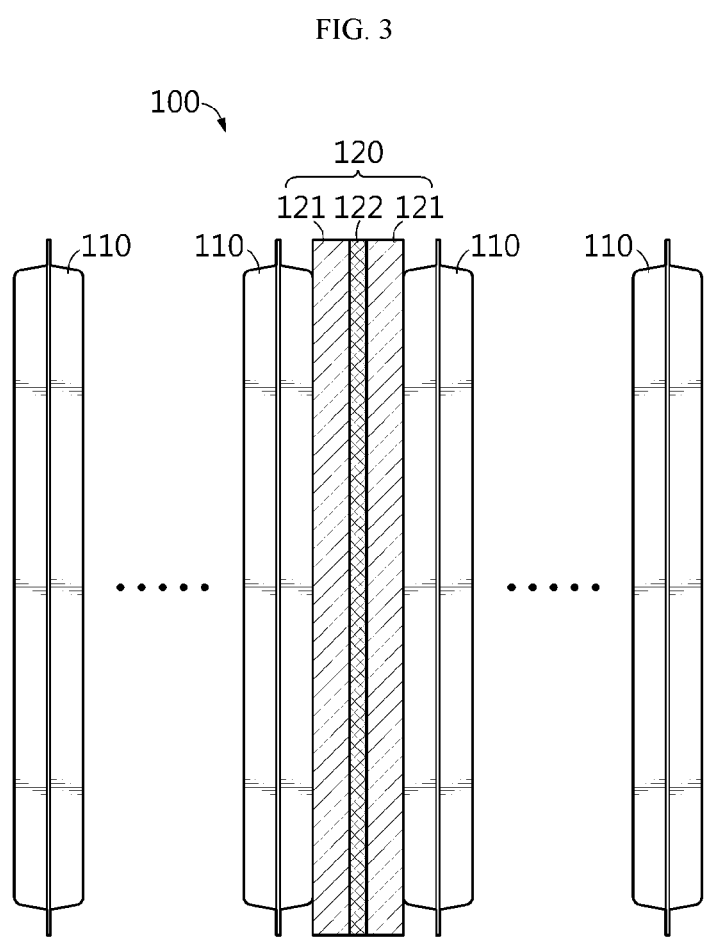
Figure 4:
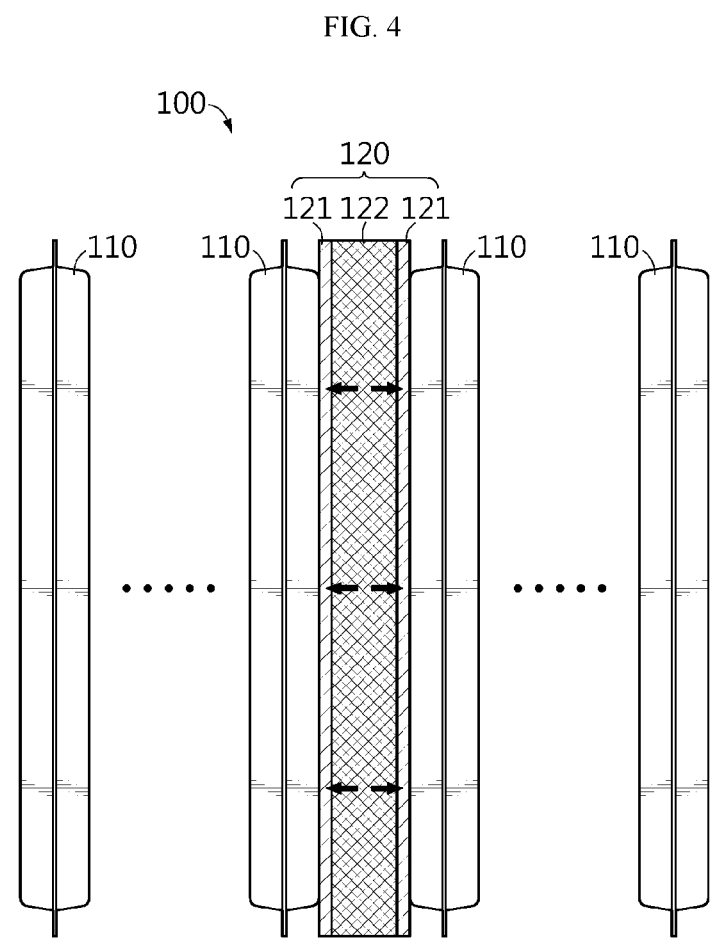

FIG. 1 is a perspective view showing a battery module according to an embodiment of the present disclosure, and FIG. 2 is a diagram showing a battery cell applied to the battery module according to an embodiment of the present disclosure. Also, FIG. 3 is a diagram showing a cell stack applied to the battery module according to an embodiment of the present disclosure, in which the temperature in the battery module is lower than a reference temperature, and FIG. 4 is a diagram showing the cell stack applied to the battery module according to an embodiment of the present disclosure, in which the temperature in the battery module is equal to or higher than the reference temperature.

Referring to FIGS. 1 to 4, a battery module according to an embodiment of the present disclosure includes a cell stack 100 and a module case 200 for accommodating the cell stack 100. The cell stack 100 includes a plurality of battery cells 110 and at least one pad composite 120 interposed between neighboring battery cells 110.

As the battery cell 110, for example, a pouch-type battery cell may be applied. If the battery cell 110 is a pouch-type battery cell, as shown in FIG. 2, the battery cell 110 is implemented to include an electrode assembly (not shown), a pouch case 111, an electrode lead 112 and a sealing tape 113.

Although not shown in the drawings, the electrode assembly has a form in which separators are interposed between positive electrode plates and negative electrode plates that are repeatedly stacked alternately, and separators are preferably positioned at both outermost sides for insulation, respectively.

The positive electrode plate includes a positive electrode current collector and a positive electrode active material layer coated on one side of the positive electrode current collector, and a positive electrode uncoated region not coated with a positive electrode active material is formed at one side end of the positive electrode plate. The positive electrode uncoated region functions as a positive electrode tab.

The negative electrode plate includes a negative electrode current collector and a negative electrode active material layer coated on one surface or both sides of the negative electrode current collector, and a negative electrode uncoated region not coated with a negative electrode active material is formed at one side end of the negative electrode plate. The negative electrode uncoated region functions as a negative electrode tab.

In addition, the separator is interposed between the positive electrode plate and the negative electrode plate to prevent electrode plates having different polarities from directly contacting each other. The separator may made of a porous material so that ions may be moved using the electrolyte as a medium between the positive electrode plate and the negative electrode plate.

The cell case 111 includes two regions, namely an accommodation portion 111*a* accommodating the electrode assembly and a sealing portion 111*b* extending in a circumferential direction of the accommodation portion 111*a* and thermally fused in a state where the electrode lead 112 is drawn out to seal the cell case 111.

Although not shown in the figures, the cell case 111 is sealed by affixing and thermally fusing edge portions of an upper case and a lower case made of a multi-layered pouch film in which a resin layer, a metal layer and a resin layer are stacked in order.

The pair of electrode leads 112 are connected to a positive electrode tab (not shown) and a negative electrode tab (not shown), respectively, and are drawn out of the cell case 111. The pair of electrode leads 112 are drawn in parallel to one side in a longitudinal direction of the battery cell 110 or are drawn to one side and the other side in the longitudinal direction of the battery cell 110, respectively. That is, the battery cell 110 applied to the present disclosure may be a one-directional drawing-type battery cell in which the positive electrode lead and the negative electrode lead are drawn in the same direction to each other or a two-directional drawing-type battery cell in which the positive electrode lead and the negative electrode lead are in opposite directions.

The sealing tape 113 is attached to the circumference of the electrode lead 112, and is interposed between an inner surface of the sealing portion 111b of the pouch case 111 and the electrode lead 112. The sealing tape 113 prevents the sealing property of the sealing portion 111b from being weakened due to the drawing-out of the electrode lead 112.

The pad composite 120 is interposed between neighboring battery cells 110, and may be provided just in single to minimize the increase in thickness of the cell stack 100. If the single pad composite 120 is provided as above, the pad composite 120 is preferably disposed at the center of the cell stack 100 in a stacking direction. This is to effectively block the propagation of thermal runaway between the neighboring battery cells 110.

The pad composite 120 includes a pair of swelling absorption pads 121 and a heat shielding pad 122 interposed between the pair of swelling absorption pads 121.

If swelling occurs in the battery cells 110 due to repeated charging and discharging of the battery module and thus the battery cells 110 are expanded convexly along the stacking direction, the swelling absorption pad 121 is compressed to absorb the swelling. In consideration of this function, the swelling absorption pad 121 may be made of a material with elasticity, and may include, for example, at least one of expanded polypropylene (EPP) and urethane.

If the temperature inside the battery module becomes high temperature of about 100° C. to 300° C. due to abnormal heating of the battery module, the swelling absorption pad 121 is damaged and shrunken. If the high temperature state is maintained over a certain time, the thickness gets closer to 0.

The heat shielding pad 122 is interposed between the pair of swelling absorption pads 121 to minimize heat transfer between the battery cells 110 located at both sides with the pad composite 120 being interposed therebetween. In addition, the heat shielding pad 122 has a characteristic of expanding if the temperature inside the battery module abnormally rises to a temperature (about 100° C. to 300° C.) or above at which the swelling absorption pad 121 is damaged and shrunken.

For the operating characteristics according to the temperature, the heat shielding pad 122 may include, for example, at least one of epoxy-based resin, butyl-based resin, and vinyl chloride-based resin.

If the internal temperature of the battery module rises to a reference temperature (about 100° C. to 300° C.) due to an abnormal heating phenomenon of the battery module, the heat shielding pad 122 is expanded to fill the space formed by the damage of the swelling absorption pad 121. That is, the heat shielding pad 122 prevents that the swelling absorption pad 121 is damaged due to abnormal heating of the battery module to create an empty space between the neighboring battery cells 110, thereby preventing the neighboring battery cells 110 from getting closer and efficiently blocking heat transfer.

The heat shielding pad 122 has an expansion rate of about 5 to 40 and is expanded only in the thickness direction. Therefore, if the internal temperature of the battery module rises to the reference temperature or above, the heat shielding pad 122 may be sufficiently expanded so that no empty space is generated between the neighboring battery cells 110.

In addition, the heat shielding pad 122 may have very low thermal conductivity in the range of about 0.05 to 0.5 W/m-k, and thus may minimize heat transfer between the battery cells 110 located at both sides with the pad composite 120 being interposed therebetween.

Next, a battery module according to another embodiment of the present disclosure will be described with reference to FIG. 5.

Figure 5:
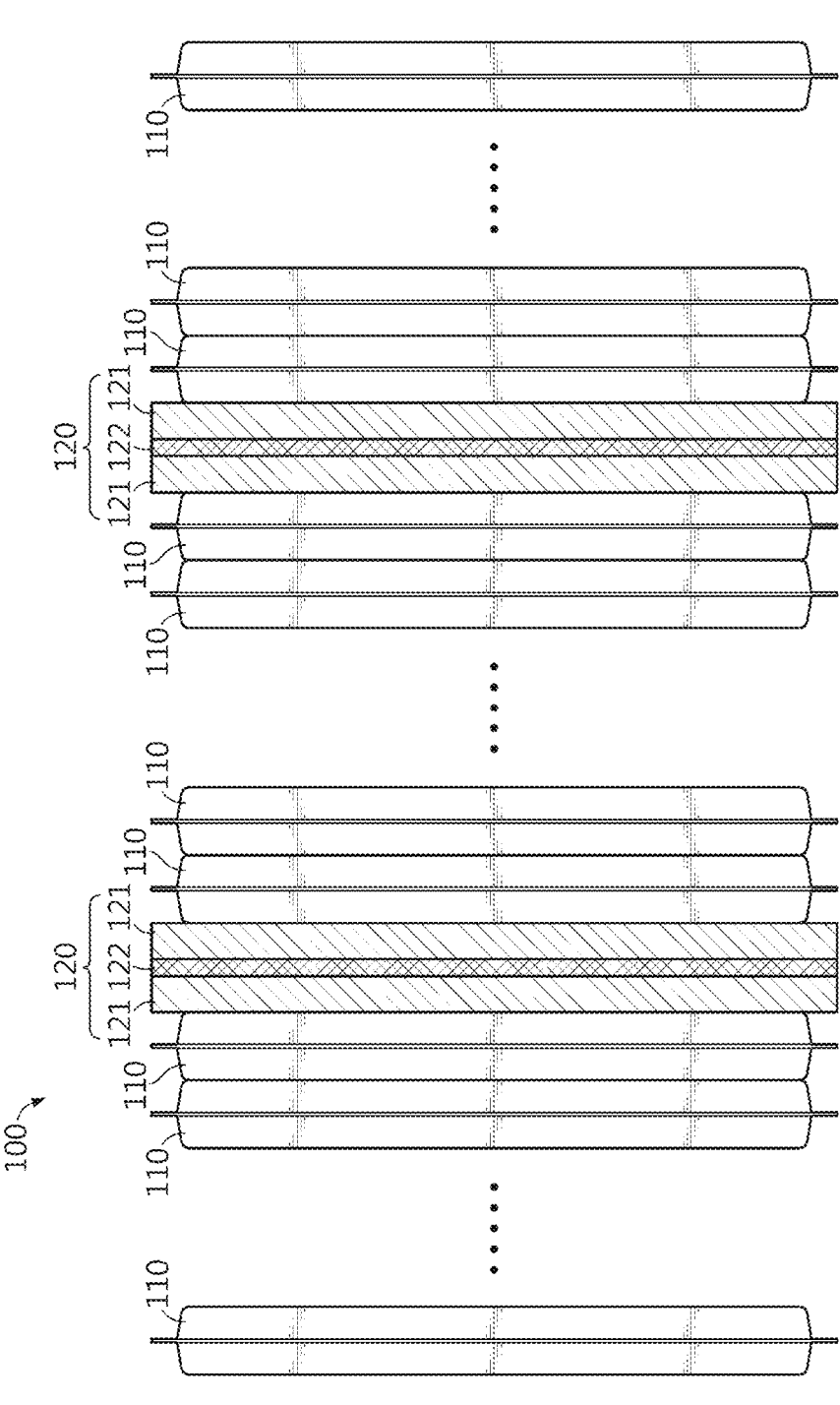
FIG. 5 is a diagram showing a cell stack applied to a battery module according to another embodiment of the present disclosure.

FIG. 5 is a diagram showing a cell stack applied to a battery module according to another embodiment of the present disclosure.

The battery module according to another embodiment of the present disclosure is different from the battery module according to the former embodiment of the present disclosure described above only in the number of the pad composite 120, and other features are substantially identical to those of the former embodiment.

Therefore, in describing the battery module according to another embodiment of the present disclosure, locations at which the plurality of pad composites 120 are provided will be intensively described, and other features identical to those of the former embodiment will not be described in detail.

Referring to FIG. 5, a battery module according to another embodiment of the present disclosure includes a plurality of pad composites 120. The pad composites 120 are respectively disposed between cell groups, each including a plurality of battery cells 110. The number of battery cells 110 included in one cell group may be determined in consideration of the number of battery cells 110 included in the battery module, the capacity of the battery cells 110, the thickness of the pad composite 120, or the like.

Next, a battery module according to still another embodiment of the present disclosure will be described with reference to FIG. 6.

Figure 6:
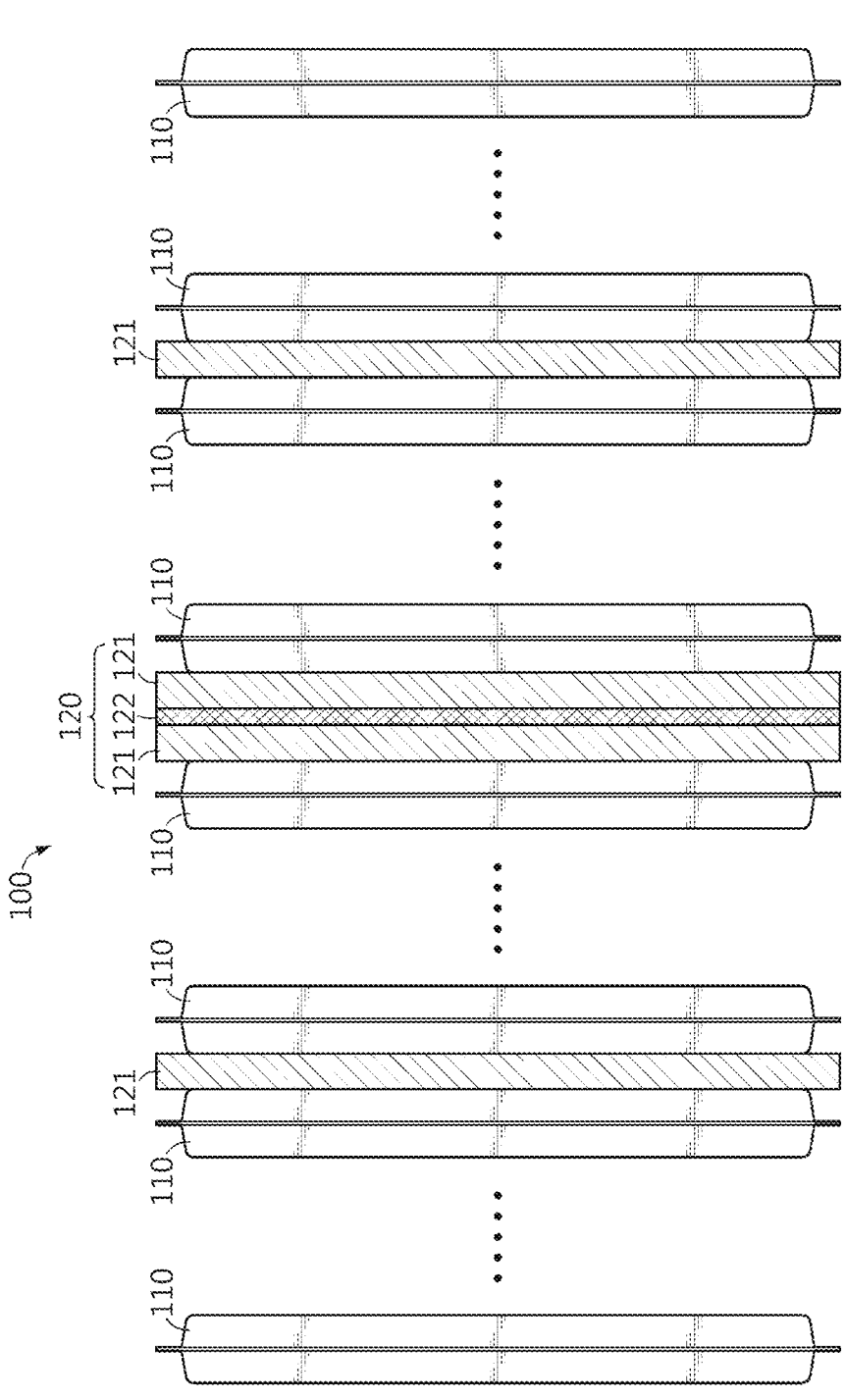
FIG. 6 is a diagram showing a cell stack applied to a battery module according to still another embodiment of the present disclosure.

FIG. 6 is a diagram showing a cell stack applied to a battery module according to still another embodiment of the present disclosure.

The battery module according to still another embodiment of the present disclosure is different from the battery module according to the former embodiment of the present disclosure described above only in that the swelling absorption pad 121 is further applied in addition to the pad composite 120, and other features are substantially identical to those of the former embodiment.

Therefore, in describing the battery module according to another embodiment of the present disclosure, a location at which the swelling absorption pad 121 is additionally applied will be intensively described, and other features identical to those of the former embodiment will not be described in detail.

The battery module according to still another embodiment of the present disclosure further includes a plurality of swelling absorption pads 121 respectively disposed between cell groups, each including a plurality of battery cells 110, in addition to the pad composite 120 disposed at the center of the cell stack 100 in the thickness direction.

If the swelling absorption pads 121 are applied to various locations of the cell stack 100 as described above, the volume expansion caused by swelling of the battery cell 110 may be stably absorbed. In addition, since the battery module according to still another embodiment of the present disclosure includes the pad composite 120 at the center of the cell stack 100, similar to the battery module according to the former embodiment of the present disclosure described above, even when abnormal heating occurs, it is possible to prevent or delay the propagation of thermal runaway, bordered on the center of the cell stack 100 in the thickness direction, thereby ensuring the safety of the battery module in use.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:

a cell stack including a plurality of battery cells;

at least one pad composite interposed between neighboring battery cells of the plurality of battery cells; and a module case configured to accommodate the cell stack, wherein the pad composite includes:

a pair of swelling absorption pads compressed by a volume expansion of the plurality of battery cells caused by swelling; and a heat shielding pad interposed between and directly contacting the pair of swelling absorption pads to block heat transfer between the neighboring battery cells and configured to expand at a reference temperature ranging from about 100° C. to 300° C., wherein the heat shielding pad has a thickness direction between the pair of swelling absorption pads, wherein the heat shielding pad expands only in the thickness direction, wherein in a first state, a thickness of the heat shielding pad is less than a thickness of each of the pair of swelling absorption pads and, in a second state above the reference temperature ranging from about 100° C. to 300° C., the thickness of the heat shielding pad is greater than a combined thickness of the pair of swelling absorption pads, wherein the heat shielding pad is configured, when expanded above the reference temperature, to fill a space formed by shrinkage due to damage of the swelling absorption pad, preventing a distance between neighboring battery cells from decreasing, and thus preventing heat transfer between the neighboring battery cells from being facilitated, wherein the pair of swelling absorption pads includes expanded polypropylene (EPP), wherein the heat shielding pad includes at least one of epoxy-based resin, butyl-based resin, and vinyl chloride-based resin, wherein the pad composite is provided in single, and the single pad composite is disposed at a center of the cell stack in a stacking direction, and wherein the battery module further comprising a plurality of swelling absorption pads respectively disposed between cell groups, each including a plurality of battery cells.

2. The battery module according to claim 1, wherein the heat shielding pad has an expansion rate of 5 to 40 times in the thickness direction at the reference temperature or above.

3. The battery module according to claim 1, wherein each of the plurality of battery cells is a pouch-type battery cell.

4. A battery pack, comprising the battery module according to claim 1.

5. A vehicle, comprising the battery module according to claim 1.

* * * * *